(12) United States Patent
Lai et al.

(10) Patent No.: US 8,621,598 B2
(45) Date of Patent: Dec. 31, 2013

(54) METHOD AND APPARATUS FOR SECURELY INVOKING A REST API

(75) Inventors: Ray Y. Lai, Fremont, CA (US); Ka Fu Chan, San Jose, CA (US)

(73) Assignee: Intuit Inc., Mountain View, CA (US)

( * ) Notice: Subject to any disclaimer, the term of this patent is extended or adjusted under 35 U.S.C. 154(b) by 1231 days.

(21) Appl. No.: 12/046,579

(22) Filed: Mar. 12, 2008

(65) Prior Publication Data

US 2009/0235349 A1  Sep. 17, 2009

(51) Int. Cl.
  *H04L 29/06* (2006.01)

(52) U.S. Cl.
  USPC ................................ 726/14; 726/10; 719/328

(58) Field of Classification Search
  USPC .......................................................... 726/14
  See application file for complete search history.

(56) References Cited

U.S. PATENT DOCUMENTS

| | | | | |
|---|---|---|---|---|
| 7,231,663 B2* | 6/2007 | Medvinsky | | 726/10 |
| 7,243,226 B2* | 7/2007 | Newcombe et al. | | 713/155 |
| 7,392,390 B2* | 6/2008 | Newcombe | | 713/170 |
| 7,409,557 B2* | 8/2008 | Teppler | | 713/178 |
| 7,555,757 B2* | 6/2009 | Smith et al. | | 719/328 |
| 7,647,627 B2* | 1/2010 | Maida-Smith et al. | | 726/12 |
| 7,685,416 B2* | 3/2010 | Newcombe et al. | | 713/155 |
| 7,797,406 B2* | 9/2010 | Patel et al. | | 709/220 |
| 7,804,774 B2* | 9/2010 | Yang et al. | | 370/230 |
| 7,818,792 B2* | 10/2010 | Shamsaasef et al. | | 726/10 |
| 7,860,882 B2* | 12/2010 | Hinton et al. | | 707/769 |
| 7,895,261 B2* | 2/2011 | Jones et al. | | 709/203 |
| 8,136,149 B2* | 3/2012 | Freund | | 726/11 |
| 2005/0050364 A1* | 3/2005 | Feng | | 713/201 |
| 2007/0168336 A1 | 7/2007 | Ransil | | |
| 2007/0204010 A1 | 8/2007 | Sah | | |
| 2007/0230374 A1 | 10/2007 | Altberg | | |
| 2008/0016143 A1 | 1/2008 | Bumpus | | |
| 2009/0187573 A1* | 7/2009 | Johnston et al. | | 707/10 |
| 2009/0198702 A1* | 8/2009 | Novik et al. | | 707/10 |

OTHER PUBLICATIONS

Kawahara, Yoshihiro; Kawanishi, Nao; Ozawa, Masahiro; Morikawa, Hiroyuki; Asami, Tohru. Designing a Framework for Scalable Coordination of Wireless Sensor Networks, Context Information and Web Services. ICDCSW '07. Pub. Date: 2007. Found on the World Wide Web at: http://ieeexplore.ieee.org/stamp/stamp.jsp?tp=&arnumber=4279044.*

(Continued)

*Primary Examiner* — Nathan Flynn
*Assistant Examiner* — Jeremiah Avery
(74) *Attorney, Agent, or Firm* — Park, Vaughan, Fleming & Dowler LLP; Laxman Sahasrabuddhe (57) ABSTRACT

An embodiment of the present invention provides a system that enables a user to securely invoke a REST (Representational State Transfer) API (Application Programming Interface) at an application server. A client can establish a secure communication channel with an application server, and can send a request to the application server to invoke the REST API. The client can then receive a security token from an authentication system in response to authenticating the user with the authentication system. Next, the client can receive a nonce and a timestamp from the application server. The client can then determine a security token digest using the security token, the nonce, and the timestamp. Next, the client can resend the request to the application server to invoke the REST API with the security token digest. The application server can invoke the REST API if the security token digest is valid.

20 Claims, 4 Drawing Sheets

(56) References Cited

OTHER PUBLICATIONS

Franks, J. et al., "HTTP Authentication: Basic and Digest Access Authentication", Jun. 1999, Standards Track, pp. 1-34.
"How Digest Authentication Works", Microsoft TechNet, Mar. 28, 2003, http://technet.microsoft.com/en-us/library/cc780170(WS.10).aspx, downloaded Aug. 14, 2009.

"OASIS Web Services Security (WSS) TC", OASIS, http://www.oasis-open.org/committees/tc_home.php?wg_abbrev=wss, downloaded Aug. 4, 2009.
Fielding, Roy Thomas: "Architectural Styles and the Design of Network-based Software Architectures", downloaded from Internet at http://www.ics.uci.edu/-fielding/pubs/dissertation/rest_arch_style.htm#sec5, Aug. 27, 2013.

* cited by examiner

METHOD AND APPARATUS FOR SECURELY INVOKING A REST API

BACKGROUND

Related Art

The present invention generally relates to techniques for providing secure web services.

The World Wide Web (WWW), or "web" for short, has permeated almost all aspects of our lives—from buying cameras to buying real estate, and from reading a newspaper to watching a movie. Unfortunately, the web can also be a very dangerous place where even savvy users can compromise highly sensitive information or suffer substantial financial loss.

Hence, providing secure access to web services is an important security problem. However, this problem is particularly challenging for at least two reasons. First, the Internet is inherently insecure because it is a public network. As a result, systems and techniques to provide secure access to web services over the Internet need to address a wide variety of security issues. Second, the web owes much of its phenomenal success to its highly scalable architecture, and to its user-friendly interface, e.g., the web-browser. Hence, it is important to ensure that a security solution is both scalable and user friendly. In other words, creating systems and techniques that provide secure access to web services can be very challenging because these systems and techniques need to be highly secure, scalable, and user friendly.

SUMMARY

One embodiment of the present invention provides a system that enables a user to securely invoke a REST (Representational State Transfer) API (Application Programming Interface) at an application server.

During operation, a client can establish a secure communication channel with an application server. Next, the client can use the secure communication channel to send a request to the application server to invoke a REST API. The client can then receive a security token from an authentication system in response to the user authenticating with the authentication system. Specifically, the security token can be a SAML (Security Assertion Markup Language) token, a UniAuth token, an asymmetric key, or a Kerberos ticket. Next, the client can receive a nonce and a timestamp from the application server. The client can then determine a security token digest using the security token, the nonce, and the timestamp. Specifically, the client can determine the security token digest by applying a cryptographic hash function to the security token, the nonce, and the timestamp. Next, the client can send another request to the application server to invoke the REST API with the security token digest. If the security token digest is successfully validated by the application server, the client can then receive data from the application server which is associated with the REST API invocation. Next, the client can store the data and may display the data to the user.

In some embodiments, the secure communication channel can be an HTTPS (Hypertext Transfer Protocol over Secure Socket Layer) session, and the REST API can be specified using a URL (Uniform Resource Locator).

In some embodiments, the client can receive a redirection message from the application server. The redirection message can cause the client to establish a secure communication channel with the authentication system, and to authenticate the user with the authentication system.

In one embodiment, the client can establish a secure communication session with the application server. Next, the application server can receive a request from the client to invoke a REST API. The application server can then send a nonce and a timestamp to the client. Next, the application server can receive a security token digest from the client. The application server can then validate the security token digest. If the security token digest is valid, the application server can invoke the REST API, and send the resulting output data to the client.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system perform the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

REST (Representational State Transfer)

An embodiment of the present invention assures confidentiality, integrity, and non-repudiation in REST web services, and avoids the security vulnerabilities of conventional techniques for providing a REST API.

The REST web service model is commonly used in web applications because it is easier to implement and to use by passing parameters and business data in the HTTP (Hypertext Transfer Protocol) request or response. SOAP, which is a protocol for exchanging XML (extensible Markup Language) based messages, has a security standard. Unlike SOAP, REST does not have an existing security standard, and most implementations are done over HTTP with no security. Some service providers add authentication to REST web service invocation over HTTP by using a proprietary security token. However, since each service provider has its own token, its own key management distribution mechanism, and its own proprietary security processing logic, a user has to keep track of multiple applications for accessing web services.

Furthermore, conventional approaches are vulnerable since they embed the security token in the HTTP request. Specifically, REST API invocation over HTTP has no security at all. REST API invocation over HTTPS (Hypertext Transfer Protocol over Secure Socket Layer) is still vulnerable to message replay and to spoofing attacks. Also, REST API invocation over HTTP may not support integrity and non-repudiation.

For example, a REST API invocation such as "http://rest.api.intuit.com/restapi?CallName=GetAccount Balance&SecurityToken=3A68...EF07&UserId=johndoe" can be easily intercepted using network sniffers or security testing tools, and hackers can perform a replay by modifying or guessing customer data. This can be an important security issue for both customers and service providers because without authentication, integrity, and non-repudiation, sensitive business transactions will not be adequately protected.

REST Security Tokenizer

An embodiment of the present invention provides systems and techniques for REST web services that can assure confidentiality (e.g., via authentication), integrity (e.g., the data cannot be tampered with), and non-repudiation (e.g., the parties cannot deny that the business transaction took place). Specifically, an embodiment includes the creation of a security tokenizer, and a security processing mechanism that assures confidentiality, integrity and non-repudiation.

The security tokenizer encapsulates security credentials. Depending on the security requirements of the business transaction, the security tokenizer can encapsulate different types of tokens. For example, the security tokenizer can encapsulate a SAML token which is typically used in an SSO (Single Sign-On) process. A SAML token can assure authentication and integrity. The SAML token is usually created and passed by an identity provider during the SSO process. Since the SAML token is not stored locally on the client, the SAML token can obviate key management issues.

Alternatively, the security tokenizer can encapsulate Intuit's UniAuth ticket which is used by some Intuit applications. A UniAuth ticket can assure authentication within the predefined time duration. The ticket is typically created by a UniAuth server upon user login, and has an expiry time that is usually less than one hour.

In another embodiment, the security tokenizer can tokenize asymmetric keys which are used for generating a digital certificate. This approach can assure authentication, integrity, and non-repudiation. These properties can be important for exchanging data with a third-party and for assuring a high level of protection.

The security processing mechanism creates a digest of the security token, and sends the digest when invoking the REST web service over a secure channel, e.g., over an HTTPS session. Specifically, the security processing mechanism can use a cryptographic hash function, e.g., SHA-1, to generate the digest.

In one embodiment, when the client application invokes a REST API, the server returns a nonce. The nonce is a unique random value created by the server for creating a message digest. The client then retrieves the security tokenizer in base-64 encoding, and creates a message digest. For example, the system can use a standard SHA-1 hashing algorithm to create a digest from the security token, nonce, and the system timestamp. The client can then resubmit the REST service request over HTTPS with the digest.

Since an embodiment of the present invention uses the security tokenizer digest over HTTPS, the embodiment can assure the integrity of business transactions and service requests. Further, if the embodiment uses asymmetric keys, the security tokenizer (which encapsulates the asymmetric keys) can also digitally sign the REST API invocation request. This approach can have the added advantage of providing non-repudiation capabilities.

Specifically, an embodiment of the present invention makes REST API invocation requests secure because of the following reasons. First, the embodiment uses HTTPS to ensure that communication between the client and the server is encrypted. Second, the security tokenizer digest assures confidentiality, and protects against message replay, spoofing, and brute-force attacks. Third, the embodiment can use digital signatures to assure non-repudiation.

In addition to the above-described security features, embodiments of the present invention have additional advantages when compared to conventional approaches for providing REST services. Since the security tokenizer can encapsulate different kinds of tokens, the application doesn't have to be re-written or changed when switching from one type of security token to another. Moreover, the security tokenizer doesn't "reinvent the wheel" because it reuses security infrastructures, e.g., the single sign-on infrastructure for SAML tokens, the PKI (Public Key Infrastructure) for digital certificates, etc. Further, since a security token can be managed dynamically, the token doesn't have to be stored locally. Additionally, embodiments of the present invention can be implemented with a web browser client or a desktop client. Since a SAML token can include an access rights profile which can be received from an identity provider infrastructure, an embodiment of the present invention can use the access rights profile to determine access rights for a user.

Network

Figure 1:
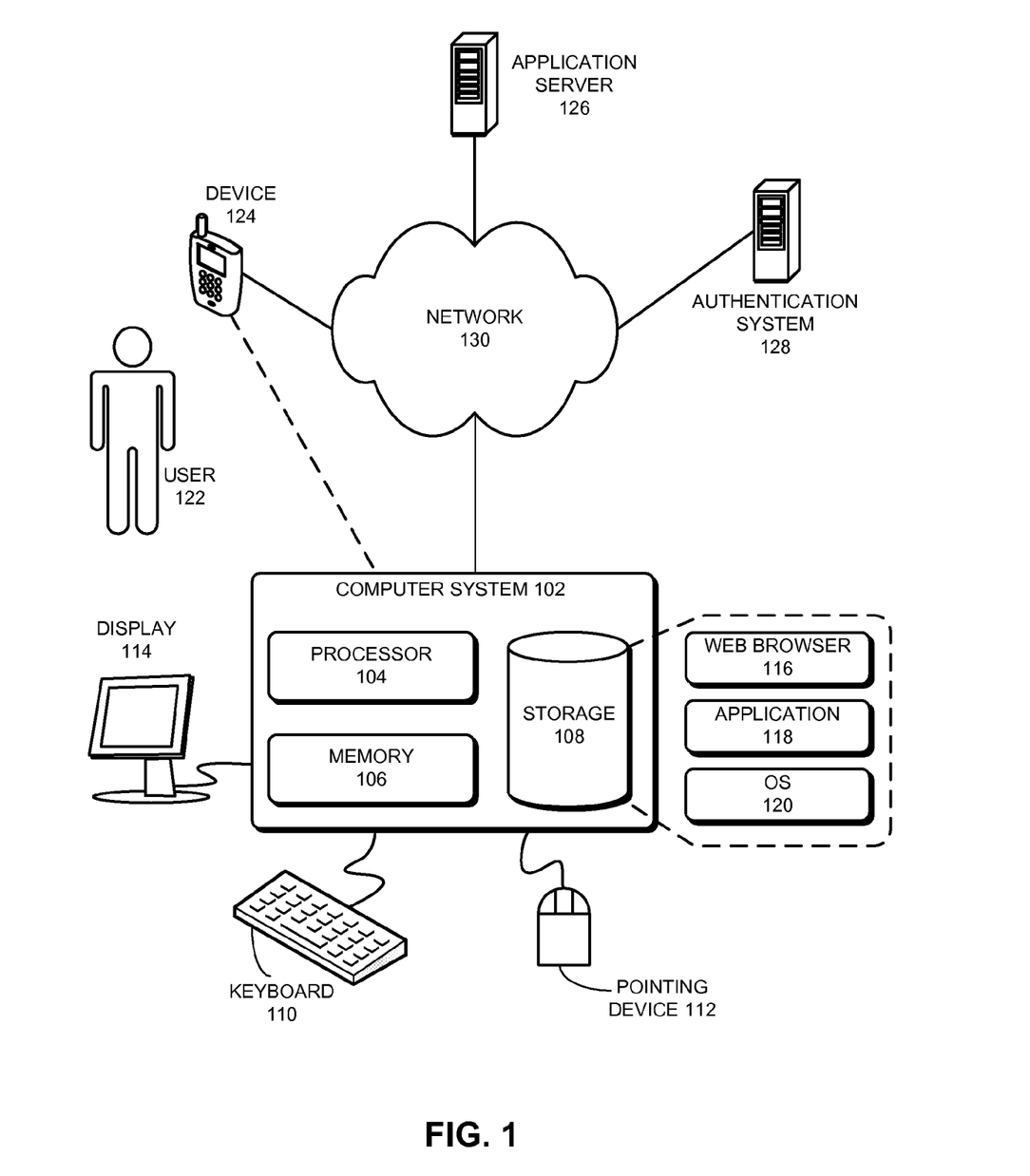
FIG. 1 illustrates a network in accordance with an embodiment of the present invention.

FIG. 1 illustrates a network in accordance with an embodiment of the present invention.

Computer 102 comprises processor 104, memory 106, and storage device 108. Computer 102 can be coupled with display 114, keyboard 110, and pointing device 112. Storage device 108 can store web browser 116, application 118, and operating system 120. During operation, computer 102 can load operating system 120 into memory 106. Next, user 122 can load web browser 116 into memory 106 and use it to browse the World Wide Web.

Computer 102 can be coupled with network 130 which can enable computer 102 to communicate with application server 126 and authentication system 128. Network 130 can generally comprise any type of wire or wireless communication channel capable of coupling together network nodes. This includes, but is not limited to, a local area network, a wide area network, or a combination of networks, or other network enabling communication between two or more computing systems. In one embodiment of the present invention, network 130 comprises the Internet.

User 122 may use web browser 116 to communicate with application server 126 which may support an online application. Device 124 may also be used for web-browsing or for invoking a REST API. Device 124 may be coupled with network 130 via a wire or wireless communication channel. For example, device 124 may be coupled with network 130 via a Wi-Fi channel (shown using a solid line). In addition, device 124 may also be coupled directly with computer 102 via a wire or wireless communication channel (shown using a dashed line). For example, device 124 may be coupled with computer 102 via USB (Universal Serial Bus) and/or Bluetooth.

Process for Securely Invoking a REST API

Figure 2:
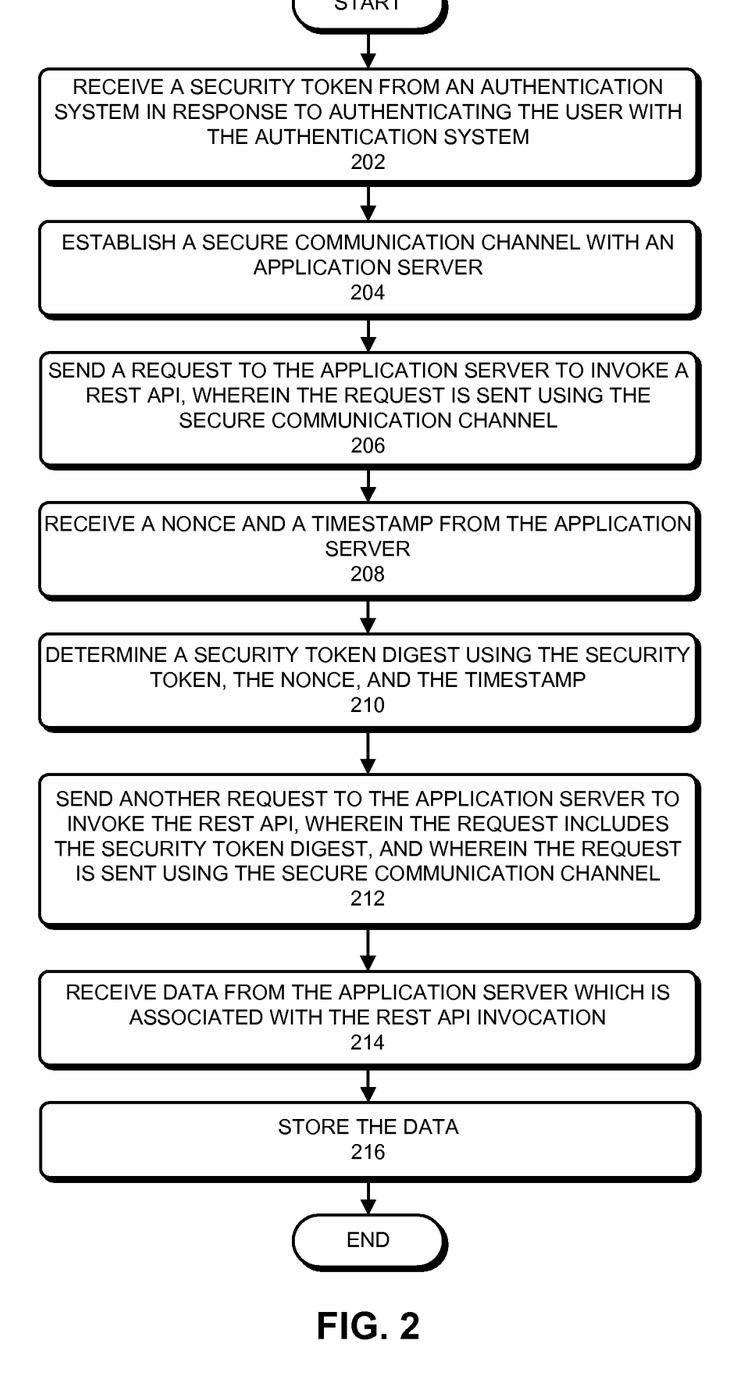
FIG. 2 presents a flowchart which illustrates how a user can securely invoke a REST API at an application server in accordance with an embodiment of the present invention.

FIG. 2 presents a flowchart which illustrates how a user can securely invoke a REST API at an application server in accordance with an embodiment of the present invention.

A client can receive a security token from an authentication system in response to authenticating the user with the authentication system (step 202). The authentication system can include one or more computers which are used for authentication purposes. For example, the authentication system can be an identity provider server, and the security token can be a SAML token that is generated during a single sign-on process. Alternatively, the authentication system may include a Kerberos authentication server and a Kerberos ticket granting server, and the security token can be a Kerberos ticket.

Next, the client can establish a secure communication channel with an application server (step 204). For example, the client can set up an HTTPS session with the server. Note that not all SSL (Secure Socket Layer) implementations check the server's digital certificate, and hence, they are vulnerable to man-in-the-middle attacks.

The client can then send a request to the application server to invoke the REST API, wherein the request is sent using the secure communication channel (step 206). For example, the REST API can be invoked using a URL, and the request can be sent as an HTTP "GET" message over the HTTPS session.

Next, the client can receive a nonce and a timestamp from the application server (step 208). The nonce can be a pseudo-random number that is generated by the application server, and the timestamp can be the application server's system time.

The client can then determine a security token digest using the security token, the nonce, and the timestamp (step 210). Specifically, the system can generate the security token digest by applying a cryptographic hash function to the security token, the nonce, and the timestamp. In one embodiment, the cryptographic hash function can be SHA-1.

Next, the client can send another request to the application server to invoke the REST API, wherein the request includes the security token digest, and wherein the request is sent using the secure communication channel (step 212).

The client can then receive data from the application server which is associated with the REST API invocation (step 214). For example, the data can be included in an HTTP response message which is received over the HTTPS session.

Next, the client can store the data (step 216). For example, the client can store the data in memory or in another computer-readable storage medium.

Figure 3:
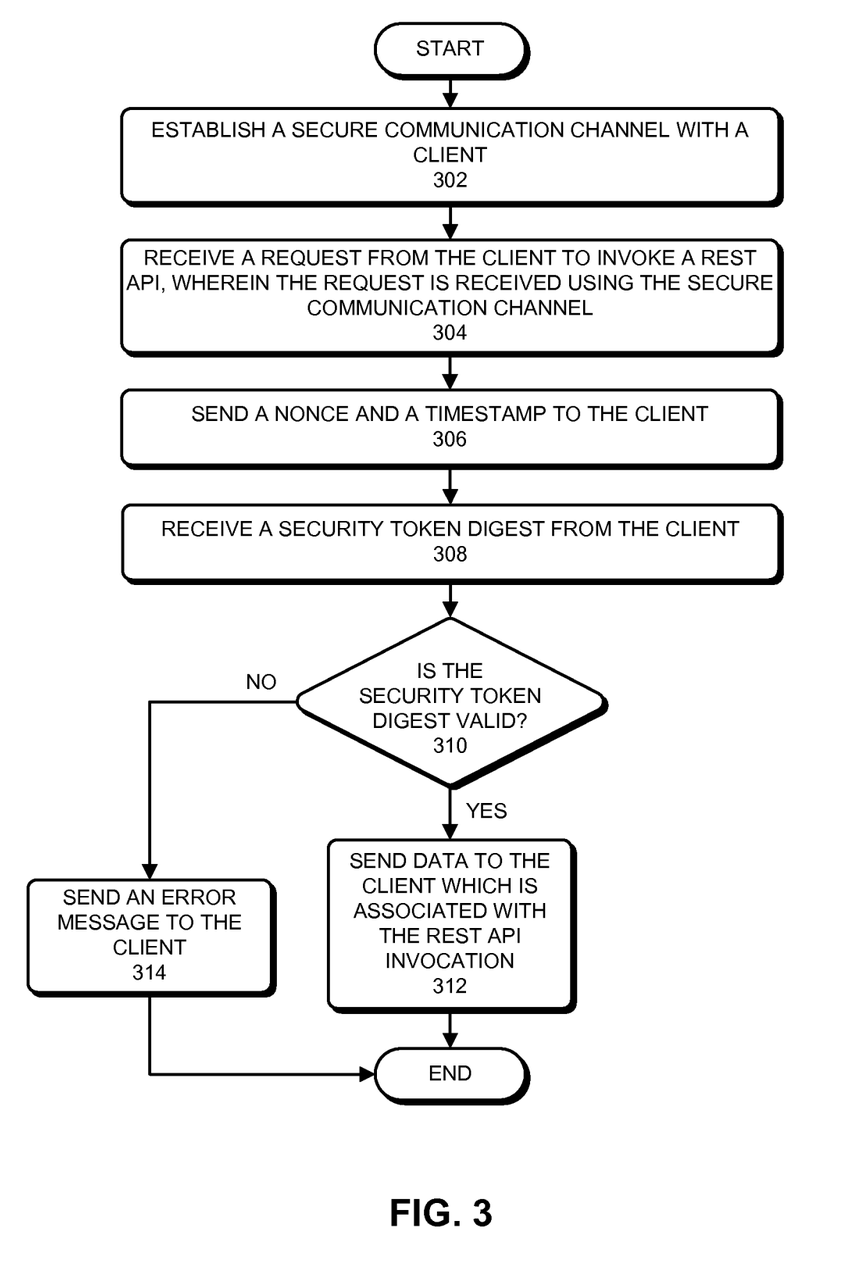
FIG. 3 presents a flowchart which illustrates how an application server can enable a user to securely invoke a REST API in accordance with an embodiment of the present invention.

FIG. 3 presents a flowchart which illustrates how an application server can enable a user to securely invoke a REST API in accordance with an embodiment of the present invention.

An application server can establish a secure communication channel with a client (step 302). Next, the application server can receive a request from the client to invoke the REST API, wherein the request is received using the secure communication channel (step 304).

The application server can then send a nonce and a timestamp to the client (step 306). Next, the application server can receive a security token digest from the client (step 308).

The application server can then determine whether the security token digest is valid (step 310). Specifically, the application server can validate the security token digest using the security token, the nonce, and the timestamp.

If the security token digest is valid, the application server can send data to the client which is associated with the REST API invocation (step 312).

Otherwise, if the security token digest is invalid, the application server can send an error message to the client (step 314).

These descriptions have been presented for purposes of illustration and description, and are not intended to limit the present invention to the forms disclosed. Accordingly, many modifications and variations will be apparent to practitioners skilled in the art. For example, in one embodiment, in response to receiving a request to invoke a REST API, the application server can send a redirection message to the client to redirect the client to an authentication system. The redirection message can cause the client to establish a secure communication channel with the authentication system. Next, the client can use the secure communication channel to authenticate a user with the authentication system and receive a security token. The client can then generate a security token digest and use the digest to securely invoke the REST API. After the user authenticates with the authentication system, the authentication system may send a redirection message to the client to redirect the client to the application server. In one embodiment, the redirection message may cause the client to send the security token to the application server.

Exemplary Embodiment

Figure 4:
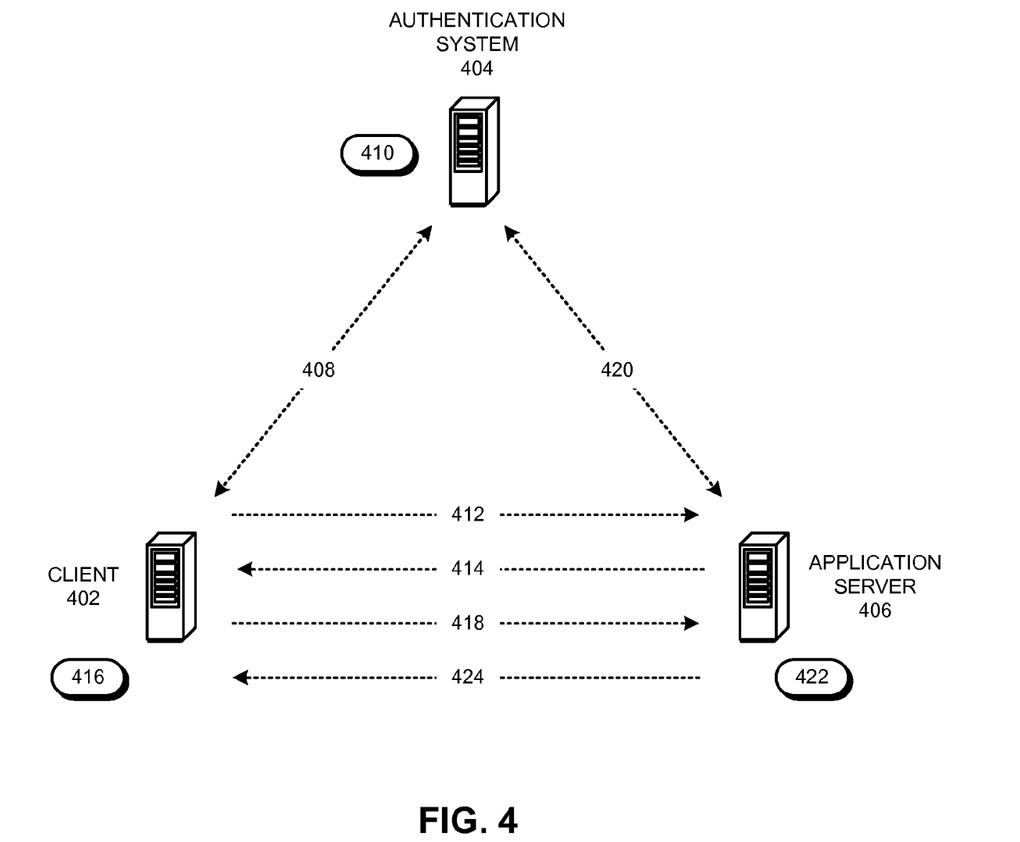
FIG. 4 illustrates a system for securely invoking a REST API in accordance with an embodiment of the present invention.

FIG. 4 illustrates a system for securely invoking a REST API in accordance with an embodiment of the present invention.

Client 402, authentication system 404, and application server 406 can communicate with one another using a network. In one embodiment, authentication server 406 can be an identity provider server.

The process can begin when a user uses client 402 to authenticate with authentication server 404 and receives security token 410 (step 408).

Next, client 402 can invoke a REST API at application server 406 (step 412). For example, client 402 can invoke a REST API by sending an HTTP "GET" request to application server 406.

Application server 406 can then send a nonce and a timestamp to client 402 (step 414). In a variation on this embodiment, application server 406 may send only a timestamp to client 402. Next, client 402 can generate security token digest 416 by applying a cryptographic hash function to security token 410, the nonce, and the timestamp.

Next, client 402 can invoke the REST API at application server 406 using security token digest 416 (step 418).

Application server 406 may then verify security token digest 416 with authentication server 404 (step 420). In one embodiment, application server 406 can verify security token digest 416 using JAAS (Java™ Authentication and Authorization Service). (Java™ is a trademark of Sun Microsystems, Inc., which may be registered in the United States and/or other countries.)

Once the security token digest 416 is verified, application server 406 can process the REST API invocation to generate output data 422. For example, application server 406 may perform a database query to generate output data 422.

Next, application server 406 can send output data 422 to client 402 (step 424). Client 402 can then display output data 422 to the user.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for enabling a user to securely invoke a REST (Representational State Transfer) API (Application Programmer Interface) at an application server, the method comprising:
   establishing a first secure communication channel with an application server;
   sending, from a client, a first request to the application server to invoke the REST API, wherein the first request is sent using the first secure communication channel;
   receiving a security token from an authentication system in response to authenticating the user with the authentication system;
   receiving a nonce and a timestamp from the application server, wherein the nonce is a pseudo-random number that is generated by the application server and the timestamp is the application server's system time;
   determining, at the client, a security token digest by combining the security token, the nonce, and the timestamp;
   sending, from the client, a second request to the application server to invoke the REST API, wherein the second request includes the security token digest and the first request, and wherein the second request is sent using the first secure communication channel;
   receiving data at the client from the application server which is associated with the request to invoke the REST API; and
   storing the data.

2. The method of claim 1, wherein the secure communication channel is an HTTPS (Hypertext Transfer Protocol over Secure Socket Layer) session, and wherein the REST API is specified using a URL (Uniform Resource Locator).

3. The method of claim 1, wherein a type of the security token is one of:
   a SAML (Security Assertion Markup Language) token;
   a UniAuth token;
   an asymmetric key; or
   a Kerberos ticket.

4. The method of claim 1, wherein combining the security token, the nonce, and the timestamp comprises applying a cryptographic hash function to the security token, the nonce, and the timestamp.

5. The method of claim 1, wherein prior to receiving the security token from the authentication system, the method comprises:
   receiving a redirection message from the application server, wherein the redirection message causes the client to establish a second secure communication channel with the authentication system; and
   using the second secure communication channel to authenticate the user with the authentication system.

6. A non-transitory computer-readable storage medium storing instructions that when executed by a computer cause the computer to perform a method for enabling a user to securely invoke a REST (Representational State Transfer) API (Application Programmer Interface) at an application server, the method comprising:
   establishing a first secure communication channel with an application server;
   sending, from a client, a first request to the application server to invoke the REST API, wherein the first request is sent using the first secure communication channel;
   receiving a security token from an authentication system in response to authenticating the user with the authentication system;
   receiving a nonce and a timestamp from the application server, wherein the nonce is a pseudo-random number that is generated by the application server and the timestamp is the application server's system time;
   determining, at the client, a security token digest by combining the security token, the nonce, and the timestamp;
   sending, from the client, a second request to the application server to invoke the REST API, wherein the second request includes the security token digest and the first request, and wherein the second request is sent using the first secure communication channel;
   receiving data at the client from the application server which is associated with the request to invoke the REST API; and
   storing the data.

7. The computer-readable storage medium of claim 6, wherein the secure communication channel is an HTTPS (Hypertext Transfer Protocol over Secure Socket Layer) session, and wherein the REST API is specified using a URL (Uniform Resource Locator).

8. The computer-readable storage medium of claim 6, wherein the security token is one of:
   a SAML (Security Assertion Markup Language) token;
   a UniAuth token;
   an asymmetric key; or
   a Kerberos ticket.

9. The computer-readable storage medium of claim 6, wherein combining the security token, the nonce, and the timestamp comprises applying a cryptographic hash function to the security token, the nonce, and the timestamp.

10. The computer-readable storage medium of claim 6, wherein prior to receiving the security token from the authentication system, the method comprises:
    receiving a redirection message from the application server, wherein the redirection message causes the client to establish a second secure communication channel with the authentication system; and
    using the second secure communication channel to authenticate the user with the authentication system.

11. A method for enabling a user to securely invoke a REST (Representational State Transfer) API (Application Programming Interface) at an application server, the method comprising:
    establishing a first secure communication channel with a client;
    receiving a first request from the client to invoke the REST API, wherein the first request is received using the first secure communication channel;
    in response to receiving the first request, sending a nonce and a timestamp to the client, wherein the nonce is a pseudo-random number that is generated by the application server and the timestamp is the application server's system time;
    receiving a security token digest from the client;
    determining whether the security token digest is valid by validating the security token digest;

upon determining that the security token digest is valid:
  generating output data by using data for the first request to invoke the REST API; and
  sending the output data to the client.

12. The method of claim 11, wherein the secure communication channel is an HTTPS (Hypertext Transfer Protocol over Secure Socket Layer) session, and wherein the REST API is specified using a URL (Uniform Resource Locator).

13. The method of claim 11, wherein the security token is one of:
  a SAML (Security Assertion Markup Language) token;
  a UniAuth token;
  an asymmetric key; or
  a Kerberos ticket.

14. The method of claim 11, wherein validating the security token digest includes applying a cryptographic hash function to the security token, the nonce, and the timestamp.

15. The method of claim 11, wherein the method further comprises:
  sending a redirection message to the client, wherein the redirection message causes the client to:
    establish a second secure communication channel with the authentication system; and
    use the second secure communication channel to authenticate the user with the authentication system.

16. A non-transitory computer-readable storage medium storing instructions that when executed by a computer cause the computer to perform a method for enabling a user to securely invoke a REST (Representational State Transfer) API (Application Programming Interface) at an application server, the method comprising:
  establishing a first secure communication channel with a client;
  receiving a first request from the client to invoke the REST API, wherein the first request is received using the first secure communication channel;
  in response to receiving the first request, sending a nonce and a timestamp to the client, wherein the nonce is a pseudo-random number that is generated by the application server and the timestamp is the application server's system time;
  receiving a security token digest from the client;
  determining whether the security token digest is valid by validating the security token digest;
  upon determining that the security token digest is valid:
    generating output data by using data for the first request to invoke the REST API; and
    sending the output data to the client.

17. The computer-readable storage medium of claim 16, wherein the method further comprises:
  sending a redirection message to the client, wherein the redirection message causes the client to:
    establish a second secure communication channel with the authentication system; and
    use the second secure communication channel to authenticate the user with the authentication system.

18. The method of claim 3, further comprising determining the type of the security token based on security requirements for a business transaction for the data.

19. The method of claim 1, further comprising using the first channel to send the first request, receive the security token, receive the nonce and the timestamp, send the second request, and receive the data from the application server.

20. The method of claim 1, further comprising digitally signing the second request before sending the second request.

* * * * *